United States Patent [19]

Zaragoza et al.

[11] Patent Number: 4,492,011

[45] Date of Patent: Jan. 8, 1985

[54] SCRAPER TO ROUGH DOWN THE SURFACES OF A COATED FINISH

[76] Inventors: Antoine Zaragoza; Raymond Zaragoza, both of 69, Rue Lucien Cassagne, 31500 Toulouse, France

[21] Appl. No.: 339,650

[22] Filed: Jan. 15, 1982

[30] Foreign Application Priority Data

Jan. 16, 1981 [FR] France ................. 81 01103

[51] Int. Cl.³ .................... B23D 79/06
[52] U.S. Cl. .................... 29/81 G; 30/169; 15/236 R
[58] Field of Search .............. 29/81 R, 81 G, 81 L; 30/169, 280, 281, 282, 283, 293, 273, 170

[56] References Cited

U.S. PATENT DOCUMENTS

| | | | |
|---|---|---|---|
| 157,162 | 11/1874 | Duncan et al. | 30/169 |
| 761,485 | 5/1904 | Heys | 30/169 X |
| 1,412,888 | 4/1922 | Novak. | |
| 3,157,947 | 11/1969 | Oleson | 30/169 X |
| 4,339,877 | 7/1982 | Pierce | 30/293 |

FOREIGN PATENT DOCUMENTS

| | | |
|---|---|---|
| 320903 | 4/1902 | France. |
| 486156 | 12/1917 | France. |
| 653118 | 10/1928 | France. |
| 2309320 | 4/1976 | France. |
| 90762 | 2/1921 | Switzerland. |

*Primary Examiner*—Howard N. Goldberg
*Assistant Examiner*—Carl J. Arbes
*Attorney, Agent, or Firm*—Fleit, Jacobson, Cohn & Price

[57] ABSTRACT

A scraping tool more particularly intended to rough-hew surfaces coated with a primer and set up in a frame comprising at least two lateral walls and a face of a plane taken the form of the surface to rough-hew and supplied with an opening in which the sharp steel blade forming the scraper is placed so as to project of the face transversely to the displacement axis of the face on the surface to rough-hew, wherein the blade is mounted in a plane perpendicular to the plane of said face.

4 Claims, 1 Drawing Figure

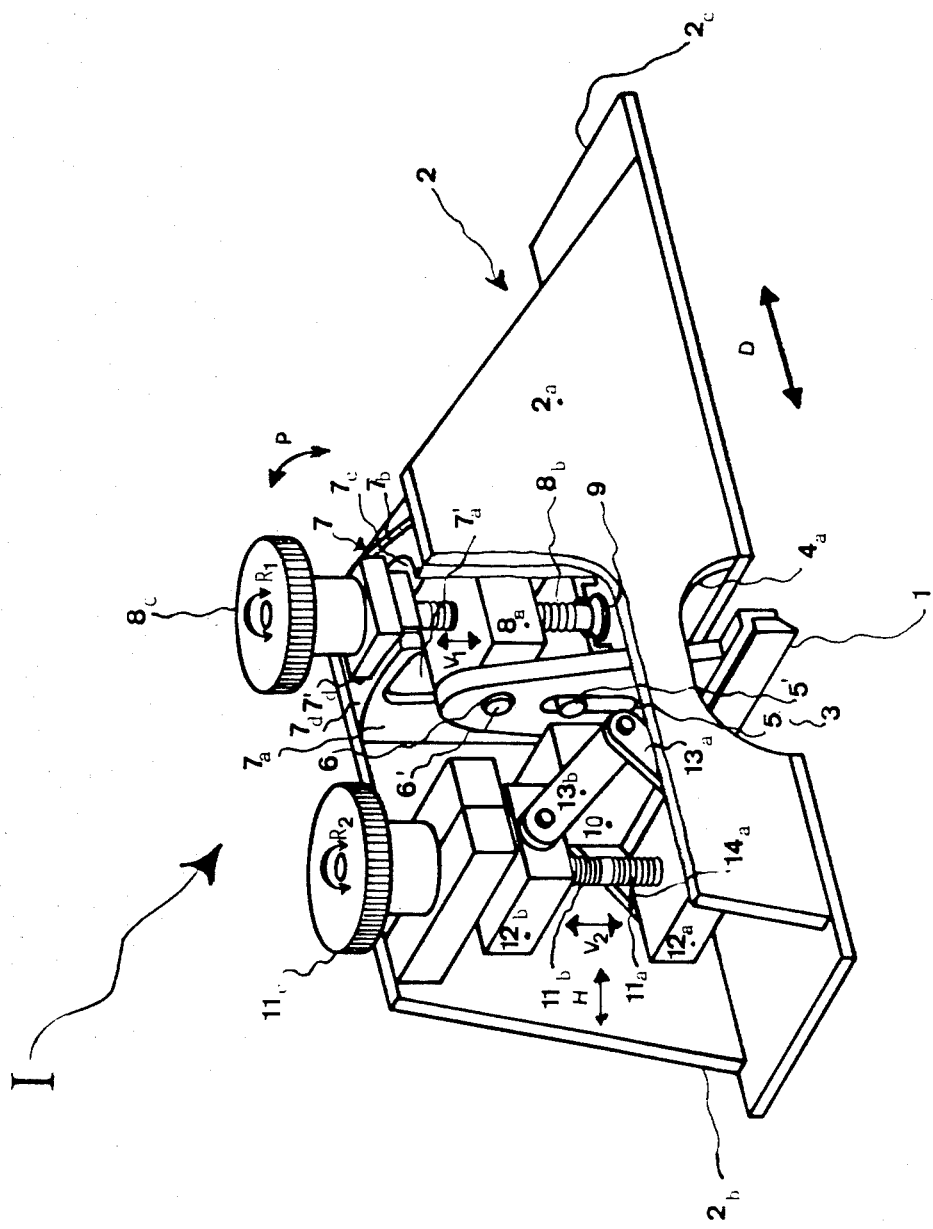

SCRAPER TO ROUGH DOWN THE SURFACES OF A COATED FINISH

The invention relates to tools allowing to rough-hew surfaces coated with a primer, more specifically the coating (mostly steel plate), which covers the undercarriage of vehicles.

The working method generally used by coach-builders and sheet-iron workers to remove the bumps from a sheet-iron consists in puttying the entire surface of it, then in pumicing it before spreading out the last bed-paint or enamel-paint. The pumicing of the putty (often presented under the form of a polyester), intended to increase the adhesion of the external layer, giving to it at the same time the bright annd plain aspect of the expected polish, is presently made by abrasion.

This operation, which is carried out by rubbing with abrasive paper whose grain-gauge will be progressively adapted to finish off the polish, is very long and often wearisome. On the other hand, the worn material is giving off as blastings containing noxious agents requiring, especially in confined atmospheres, to renew the air imperatively.

These facts have brought the applicants to design a tool allowing to obtain a surface state similar or superior to the one resulting from the pumicing operation, avoiding at the same time the dispersion of the removed materials in the surrounding air.

According to the invention, this tool is a scraping tool set up in a frame comprising a face of a plane taking the form of the surface to rough-hew; this face is supplied with an opening in which the sharp steel blade forming the scraper is placed vertically to the face, so as to project of it, and transversely to its displacement axis on the surface to work.

So, under the effect of back and forth motions of the scraping tool on the surface to rough-hew, the materials are removed as lamina which, according to an advantageous characteristic of the invention, are laterally evacuated by means of two ports shaped as involutes of circle topping the opening of the face and machined in the lateral walls of the scraping tool frame.

The problem of the dispersion of the removed materials in the surrounding air is then solved, because the scrap obtained by scraping as lamina are less volatile due to their weight than those obtained by abrasion as thin divided particles.

According to a further object of the invention, the projecting height of said blade with regard to the level of the face is adjustable, thus allowing to modify the removal thickness of the scraped material.

According to a further object of the invention, the sharp steel blade is pivotally mounted around an axis parallel to the longitudinal axis of the scraping tool frame. This arrangement allows to correct the horizontality of the blade with regard to the level of the face.

Although the aspects of the invention, considered as novel have been described here above, full details concerning preferred methods and further features of the invention will be better understood referring to the following detailed description with reference to the accompanying drawing.

The FIGURE on the drawing shows a partially sectioned perspective view of a scraping tool according to the present invention.

This scraping tool, under the reference I as a whole, is constituted by a sharp steel blade 1, bevelled at its lower extremity and set up in a frame 2 comprising two parallel flanges 2a, 2b, defining a manual gripping gear and a support mechanism for all the components of the scraping tool I, and a face of a plane 2c, taking the form of the surface to rough-hew.

The blade 1 emerges form the face 2c by means of an opening 3 and is placed transversely to the displacement axis (double directed arrow D) of the frame 2, so as to project from the said face. According to the invention, the blade 1 is placed in a plane perpendicular to the face plane so that the scraping operation could take place perpendicularly to the surface to rough-hew.

From now on, it is useful to emphasize the originality of the scraping tool of the invention with regard to the carpenter's tool intended to plane wood and known under the name of plane. As a matter of fact in this plane the sharp steel blade lies in a plane oblique to the surface to flatten, because the material to remove is wood. On the other hand, the material so removed as shavings is evacuated through the opening of the face, while the material removed by the scraping tool I as thin lamina is laterally evacuated by means of two ports 4a, 4b (the latter is not represented on the drawing) topping the opening 3 and machined in the two walls 2a and 2b of the frame 2. This disposition of the invention thus avoids the apparition of plugs of removed materials inside the tool frame.

It will be noticed that the upper part of the blade 1 is supplied with two superposed holes 5 and 6, in which two teats are inserted, 5' and 6' respectively.

The former 5', which is fixed on a spacer 7 separating the two walls 2a and 2b of the frame and made of two cheeks 7a and 7b defining between themselves a hollow space 7c, plays the part of guiding piece inside the hole with an elongated form, during the vertical motions (double directed arrow $V_1$) of the blade 1, which motions determine the projecting height of the blade with regard to the face 2c. The amplitude of these motions is controlled by the second teat 5' connected to a nut 8a fixed up inside the space 7c on a threaded rod 8b, which one is supplied with a knurled head 8c at its upper end to manually rotate rod 8b about double directed arrow $R_1$.

Thus, upon rotating the rod 8b in one of the two directions of arrow $R_1$, the thread of rod 8b drags up or down (arrow $V_1$) the nut 8a and the corresponding teat 6', so that the hole 6 of the blade 1 engaged on this teat follows the same motion.

According to a further advantageous feature of the invention, the blade 1 is also pivotally mounted (arrow P) around the teat 5', thus allowing to adjust the inclination of its sharp ridge. This motion is ensured by the combination of the three following characteristics. The first one is to fix the lower extremity of the threaded rod 8b on a tilting bearing 9; the second one is to make an opening 7'd inside the upper part connecting the two cheeks 7a and 7b, said opening allowing the motions P of the rod 8; the third one is to supply the cheek 7a with a triangular port 7'a so that the teat 6' could move freely upright (arrow $V_1$) and/or rotationally around the other teat 5' (arrow P).

The invention also proposes a means to lock the blade 1 in a position defined by the position of the teat 6' with regard to the teat 5' by means of a knurled head 8c. This means consists in compressing the upper part of the blade 1 between the cheek 7a and a plate 10 capable of moving back and forth (double directed arrow H) from said cheek by means of a mechanical control. The latter includes a cylindrical rod 11 provided on its length with two threads 11a and 11b, with opposite directions and on which two rectangular nuts 12a and 12b are mounted laterally connected to the plate 10 by means of two pairs of articulated arms 13a and 13b, 14a, 14b (the latter is not shown on the drawing). Thus, upon rotating the rod 11 in one of the two directions of arrow $R_2$, said rotating being mechanically driven by means of the knurled head 11c fixed at its upper end, the two nuts 12a and 12b move back and forth to each other (double directed arrow $V_2$), causing thus the horizontal motion (double directed arrow H) of plate 10 through arms 13a, 13b, 14a, 14b, so as to tighten or loosen the blade 1 between the plate and the cheek 7a.

The scraping tool I which has just been described and represented above is particularly intended for a mechanical use in which the feed-power causing the motions (double directed arrow D) of the blade 1 is manual and applied by the user on the frame 2. It will be clearly understood that further embodiments of the invention are possible for those skilled with the art, e.g. to design tools in which the feed-power of the blade 1 will be motorized by an electrical means or similar.

The invention which has just been described owns a large field of industrial applications. More particularly, as stated at the beginning of the present specification, it allows to rough-hew surfaces coated with a primer, such as the ones that can be found in coach-building, building trade, etc. . .

We claim:

1. A hand-operated scraping tool to rough-hew surfaces coated with a primer, said tool comprising:
    a frame, said frame comprising at least two laterial walls, a rectangular face defining a plane, said lateral walls connected to said face, a central opening defined by said face, a blade having a bevelled edge positioned within said opening, said blade inserted between said lateral walls to project beyond said face, said blade defining a plane perpendicular to the plane of said face, said blade being slidingly mounted for adjusting the depth of penetration thereof in the material to be rough-hewed, and said blade being pivotally mounted on said rod, with said rod having an axis perpendicular to said face for correcting the displacement of the blade with reference to the face, an upper portion of the blade set inside said frame, a first threaded rod pivotally mounted within said frame, two superposed holes defined by said blade, a first teat rigidly locked with the frame, said first teat set inside one of said superposed holes of said blade, said hole being elongated for allowing motion of said blade along said first teat, a second teat parallel to the first teat and movably mounted on the first threaded rod, said second teat adapted to move towards and away from said first teat, said second teat set inside the other hole of said blade, said other hole allowing said second teat housed therein to transmit motion to said blade, and said blade guided by said first teat inside said elongated hole of said blade.

2. A scraping tool as set forth in claim 1, wherein said two lateral walls of the frame are separated by a spacer, said spacer formed by a first and a second cheek delimiting a hollow space wherein said first threaded rod is rotatively mounted by means of a first knurled head, said first knurled head being fixed at an end of said first threaded rod, said first knurled head located outside the frame and said first threaded rod is swivelingly mounted on said frame by means of a tilting bearing, and wherein said second teat is movable and set inside said other hole located on said blade, said second teat rigidly locked by means of a first nut screwed on said first threaded rod so that the rotation of said first threaded rod actuated by said first knurled head transmits motion to said first nut and to the second teat and to the other hole of said blade cooperating with said nut through said second teat, wherein the first teat set inside the one elongated hole is fixed on the outer face of said first cheek closest to the blade, and first cheek having a triangular opening with a corner of said first cheek directed toward the face of the plane and allowing motion of the second movable teat crossing therein between the nut of the first threaded rod and the blade.

3. A scraping tool as set forth in claim 2, wherein said frame comprises a movable plate located between the two lateral walls, said plate being in a plane parallel to the plane of said first cheek provided with said triangular opening, and wherein said plate is adapted to move said first cheek back and forth to compress an upper part of the blade inserted between said plate and said first cheek and to lock said blade in a position determined by the operation of the kurled head, and wherein a second threaded rod disposed perpendicular to the plane of the face and rotatingly mounted by means of a second knurled head located at an end of said second threaded rod located outside the frame, and wherein said second threaded rod is provided with a first and a second reverse thread, said first and said second threads supplied with a second rectangular nut connected to said plate by means of a pair of lateral arms, whereby the rotation of said second threaded rod causes motion of both said first and said second nuts and consequently motion of the plate.

4. A hand-operated scraping tool to rough-hew surfaces coated with a primer, said tool comprising:
    a frame, said frame comprising at least two lateral walls, a rectangular face defining a plane, said lateral walls connected to said face, a central opening defined by said face, a blade having a bevelled edge positioned within said opening, said blade inserted between said lateral walls to project beyond said face, said blade defining a plane perpendicular to the plane of said face, a threaded rod pivotally mounted within said frame, said blade being movingly mounted on the rod for adjusting the depth of penetration thereof in the material to be rough-hewed, and said blade being pivotally mounted on said rod, with said rod having an axis perpendicular to said face for correcting the displacement of the blade with reference to the face, said central opening of the face extending along the width of said frame and on both sides of the plane of the blade, an arc-shaped port defined by each of said lateral walls of the frame for allowing lateral evacuation of materials.

* * * * *